United States Patent [19]

Kimura

[11] Patent Number: 4,784,357
[45] Date of Patent: Nov. 15, 1988

[54] ATTACHMENT STRUCTURE OF CAR SOUND APPARATUS

[75] Inventor: Morio Kimura, Ono, Japan
[73] Assignee: Alpine Electronics Inc., Japan
[21] Appl. No.: 932,700
[22] Filed: Nov. 19, 1986
[30] Foreign Application Priority Data Nov. 29, 1985 [JP] Japan ............................ 60-184264[U]

[51] Int. Cl.⁴ ............................................ F16M 11/00
[52] U.S. Cl. .................................. 248/27.1; 248/201; 248/551
[58] Field of Search .............. 248/201, 298, 551, 27.1, 248/27.3, 205.1, DIG. 6, ; 220/3.6, 3.3, 3.5

[56] References Cited

U.S. PATENT DOCUMENTS

| | | | |
|---|---|---|---|
| 3,305,203 | 2/1967 | Williams, Jr. | 248/201 |
| 3,746,931 | 7/1973 | Muranaka | 248/27.1 X |
| 4,098,423 | 7/1978 | Marrero | 248/27.3 X |
| 4,103,983 | 8/1978 | Morrison et al. | 248/201 X |
| 4,524,933 | 6/1985 | Rouws | 248/27.3 |
| 4,540,146 | 9/1985 | Basile | 248/201 |
| 4,572,465 | 2/1986 | Rasca | 248/27.1 |
| 4,580,754 | 4/1986 | Hughes | 248/201 X |
| 4,623,110 | 11/1986 | Kanari | 248/27.1 |
| 4,660,789 | 4/1987 | Putnam | 248/27.3 |
| 4,687,172 | 8/1987 | Stillback | 248/201 X |

Primary Examiner—Ramon S. Britts
Assistant Examiner—Karen J. Chotkowski
Attorney, Agent, or Firm—Guy W. Shoup; Paul J. Winters; Leighton K. Chong

[57] ABSTRACT

This invention provides an attachment structure of a car sound apparatus of the type in which an inner case is fitted in an opening of a dashboard panel and the car sound apparatus is inserted through an insertion hole of the inner case and attached there, which is characterized in that pin fitting portions are provided on the front ends of the side faces of the inner case each comprising an inclined edge and a fitting groove, and lock pin units are provided on the side faces of the car sound apparatus each allowing up and down movement of its lock pin, wherein at the time of attaching the car sound apparatus to the inner case the lock pin moves along the inclined edge and fits in the fitting groove of the pin fitting portion, whereas at the time of detachment the lock pin is moved upward by means of a removing member to release engagement with the fitting groove to thereby permit pulling out.

3 Claims, 5 Drawing Sheets

ATTACHMENT STRUCTURE OF CAR SOUND APPARATUS

BACKGROUND OF THE INVENTION

1. Field of the Invention

This invention relates to a structure of attaching an in-dash type car sound apparatus to an opening of a dashboard panel.

2. Description of the Prior Art

According to one conventional arrangement of attaching the in-dash type car sound apparatus, locking segments are provided on the side faces of an inner case, whereas the side faces of the car sound apparatus have substantially angular U-shaped coupling members pivoted rotatably thereto. At the time of attachment, the car sound apparatus is inserted into the inner case with its coupling members turned up and one end of each angular U-shaped coupling member is coupled to the corresponding locking segment of the inner case. At the time of detachment, each angular U-shaped coupling member is turned in the opposite direction to release the coupled state with the corresponding locking segment and the car sound apparatus is pulled out by the use of removing members engaged with the side faces thereof.

In the foregoing attachment arrangement, the coupling between the inner case and the car sound apparatus is settled through adjustment of a so-called depth stroke between the locking segments and the angular U-shaped coupling members. Consequently, as the shape of a dashboard changes, the size of projection of the front or nose of the sound apparatus varies. Therefore, in case the nose projects from the dashboard, a cover top or the margin of an opening must be drawn, for instance, to accommodate the sound apparatus. Or, in case the size of projection does not meet the requirements of destination countries, another inner case for exclusive use must be designed and manufactured separately.

SUMMARY OF THE INVENTION

The present invention has been devised to solve the foregoing drawbacks, thus, its object is to provide a novel attachment structure of a car sound apparatus.

To achieve the foregoing object, the present invention provides an attachment structure of a car sound apparatus which is characterized in that the front end of each side face of an inner case has a pin fitting portion comprising an inclined edge and a fitting groove, and each side face of the car sound apparatus has a lock pin unit allowing up and down movement of its lock pin, wherein the car sound apparatus is attached by fitting the lock pin in the pin fitting portion.

Specifically, since the lock pin unit is designed so as to allow the lock pin to move up and down, no stroke in the depthwise direction is required for adjustment of attachment; thus, the size of projection of the nose of the car sound apparatus can always be made certain and the housing itself of either the car sound apparatus or the inner case can be normalized.

DESCRIPTION OF THE PREFERRED EMBODIMENT

An attachment structure of a car sound apparatus according to the present invention will now be described with reference to the drawings.

Figure 1:
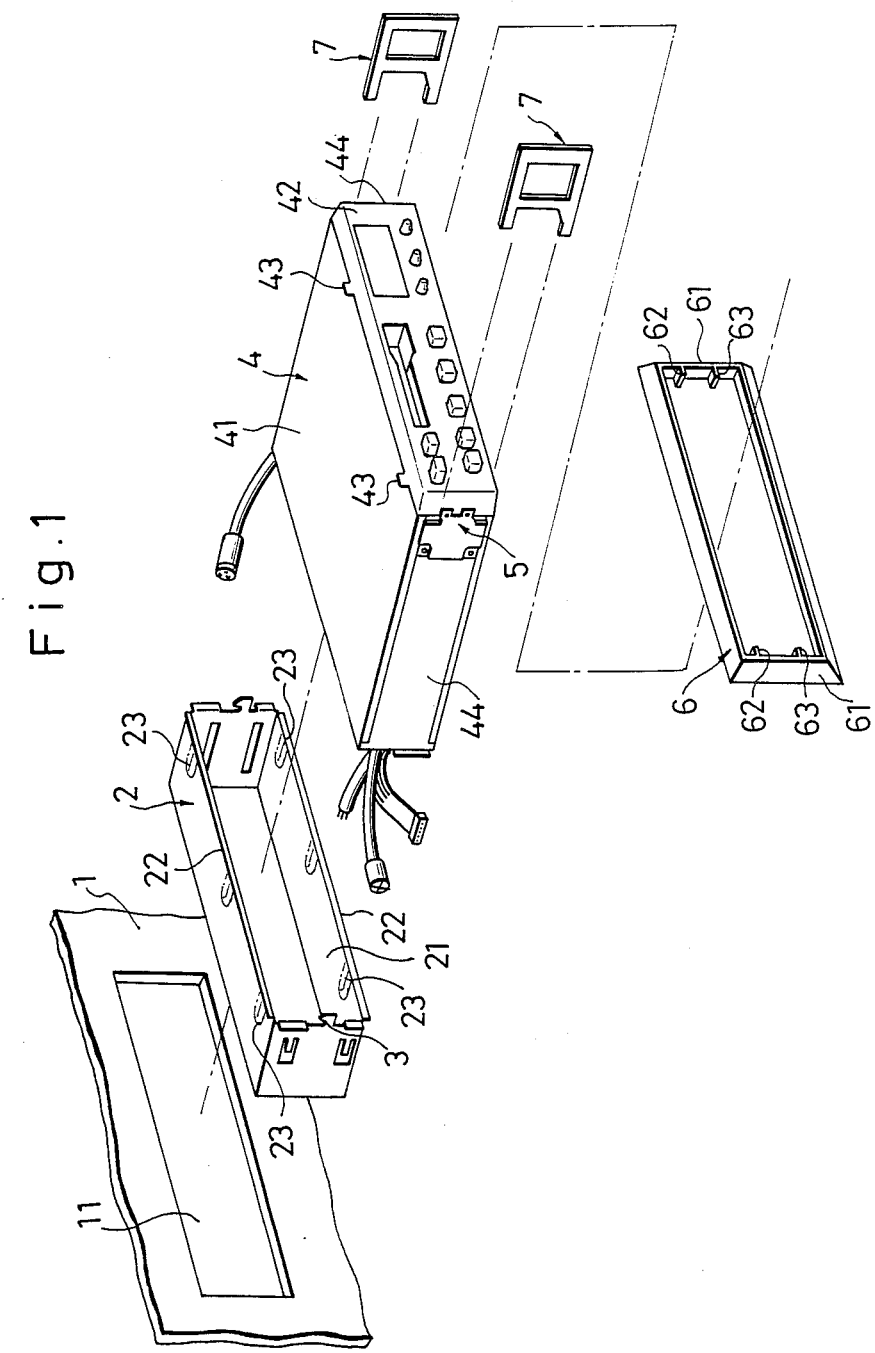
FIG. 1 is an exploded perspective view explanatory of an attachment structure of a car sound apparatus according to the present invention.

FIG. 1 is an exploded perspective view explanatory of the attachment structure of the present invention. As shown, a dashboard panel 1 of a car is cut out to form an opening 11 in which an inner case 2 is inserted. The inner case 2 comprises a substantially rectangular housing which has an insertion hole 21. The front end margin of the insertion hole 21 has stopper edges 22, 22, and the upper and lower faces and both side faces of the housing have engaging segments 23, . . . ,23 in the form of, for example, a standing pin or a cut and raised tongue segment. The front end of each side face of the housing of the inner case 2 has a pin fitting portion 3 of a configuration hereinafter described.

On the other hand, a car sound apparatus ( hereinafter referred to as a sound apparatus ) 4 comprises a housing 41 in which a certain set of sound parts are connected and disposed. The front of the housing has a nose 42 provided with a cassette insertion hole; frequency display section; push buttons; etc., and erect segments 43,...,43 on the upper and lower faces. Both side faces 44, 44 of the housing 41 have lock pin units 5, 5 of a configuration hereinafter described. After the sound apparatus 4 is inserted in the insertion hole 21 of the inner case 2 and attached there, a face plate 6 is attached so as to cover the circumference of the nose 42.

Both side edges 61, 61 of the face plate 6 have upper clamp segments 62, 62 and lower clamp segments 63, 63 spaced a certain distance from the former. To pull out the sound apparatus 4, removing members 7, 7 of a configuration hereinafter described are used.

Figure 2:
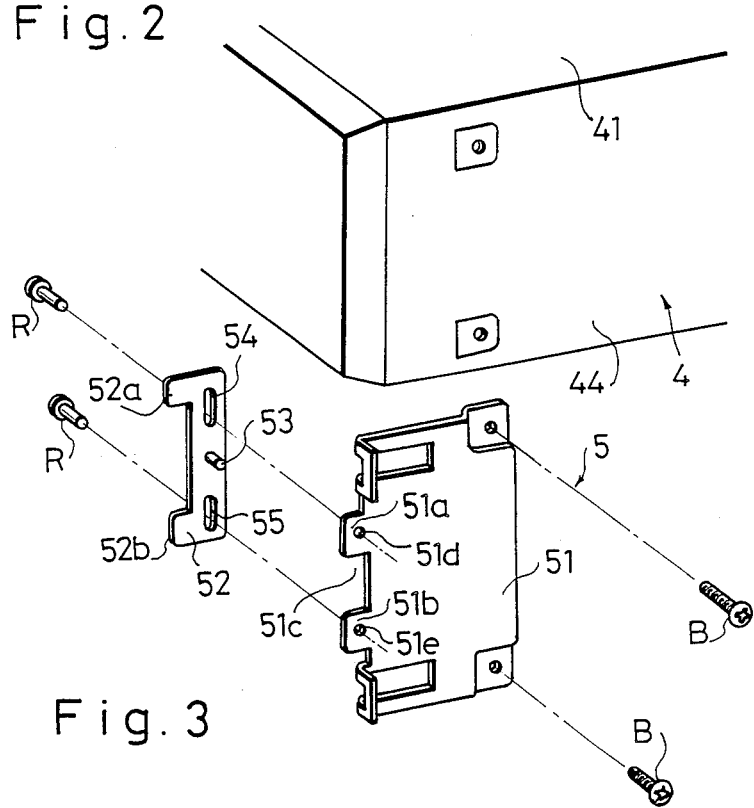
FIG. 2 is an exploded perspective view of a lock pin unit attached to the card sound apparatus.

FIG. 2 is a perspective view, with portions broken away, explanatory of the lock pin unit 5 provided on the sound apparatus 4.

The lock pin unit 5 comprises an attaching base plate 51 and an up/down movable plate 52. The attaching base plate 51 has a pair of convex portions 51a, 51b formed on one side edge with a conave portion 51c formed between the convex portions. The convex portions 51a, 51b have respective calking bores 51d, 51e.

On the other hand, the up/down movable plate 52 has substantially U-shaped projections 52a, 52b at the upper and lower ends thereof, and a lock pin 53 secured at about its center. The projections 52a, 52b have respective longitudinally elongate bores 54, 55. In assembly, the longitudinally elongate bores 54, 55 are aligned nearly with the calking bores 51d, 51e of the attaching base plates 51, rivets R, R are inserted, and they are calked so that the up/down movable plate 52 itself can move up and down. Thus, the lock pin 53 thus assembled is movable up and down in the concave portion 51c of the attaching base plate 51.

Figure 3:
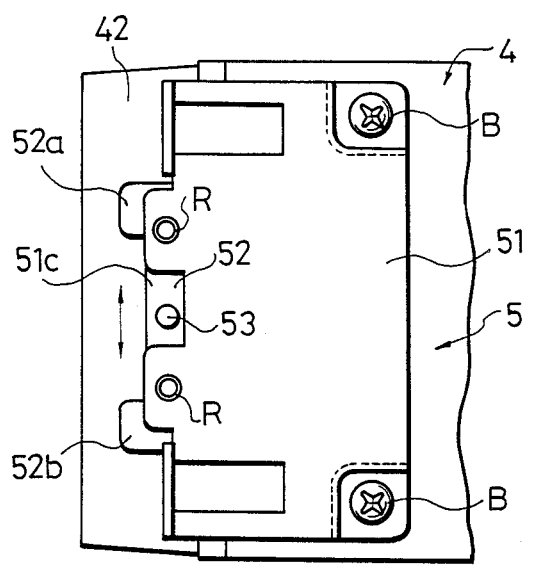
FIG. 3 is a schematic side view explanatory of the lock pin unit attached to the car sound apparatus.

Then, the lock pin unit 5 is attached by machine screws B, B to either side face 4 of the housing 41 of the sound apparatus 4. FIG. 3 is a schematic side view of the sound apparatus 4 to which the lock pin unit 5 is attached in the manner above. As shown in this drawing, the up/down movable plate 52 is movable up and down ( in the direction of the arrow ) relatively with respect to the attaching base plate 51. Accordingly, the lock pin 53 also moves up and down within the concave portion 51c.

Figure 4:
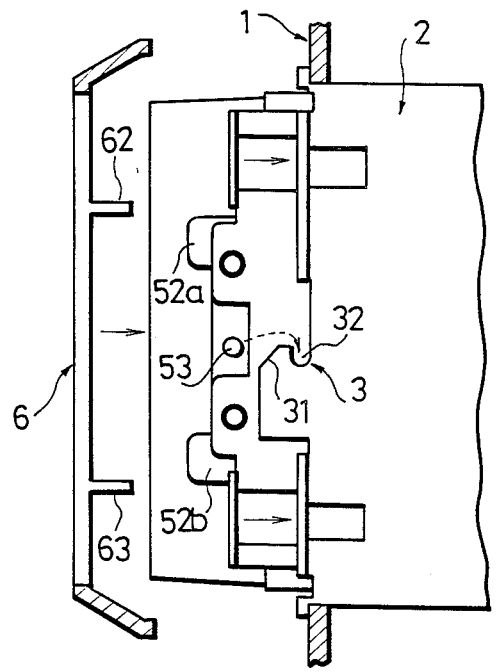
FIG. 4 is a schematic side view showing the state in which the car sound apparatus is inserted in an inner case and a face plate is going to be attached.

FIG. 4 is a side view, with portions broken away, showing the state in which the sound apparatus 4 having the lock pin units 5 attached thereto is inserted in the inner case 2 having the pin fitting portions 3 on the front ends of the side faces of its housing, and the face plate 6 is going to be attached.

Figure 5:
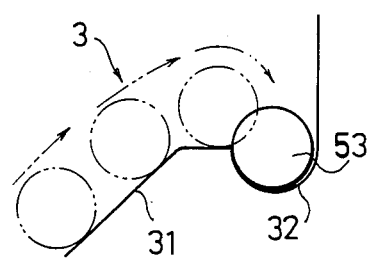
FIG. 5 is an enlarged view of the important portion showing the state in which a lock pin is going to be fitted in a fitting groove.
Figure 6:
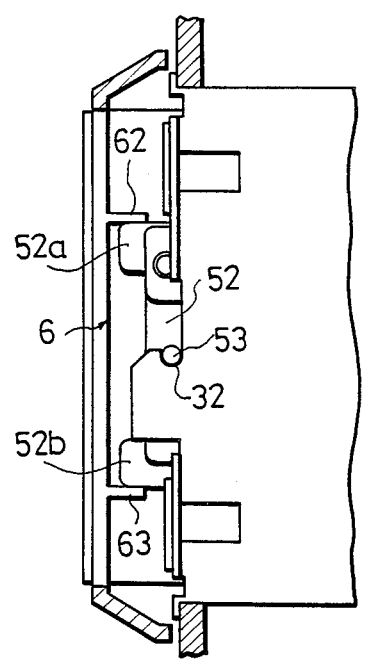
FIG. 6 is a schematic side view showing the state after attachment.

Specifically, as the housing 41 of the sound apparatus 4 is inserted through the insertion hole 21 of the inner case 2 and pushed gradually in the depthwise direction ( in the direction of arrow of FIG. 4 ), the lock pin 53 abuts on an inclined edge 31 of the pin fitting portion 3 and moves along the inclined edge 31 as shown in FIG. 5. Finally ( as soon as the stopper edges 22,..., 22 abut on the erect segments 43,...,43 ), the lock pin 53 falls in a fitting groove 32, thereby coming to the fitted state. In the thus attained state, the face plate 6 is attached to the circumference of the nose 42 from the front of the sound apparatus 4. As a result, as shown in FIG. 6, the upper clamp segments 62, 62 and lower clamp segments 63, 63 abut on the respective outsides of both projections 52a, 52b of the up/down movable plates 52, whereby the up and down movement of each up/down movable plate 52 is restricted. Therefore, the lock pin 52 cannot come off the fitting groove 32. That is, the sound apparatus 4 cannot come off the inner case 2.

Figure 7:
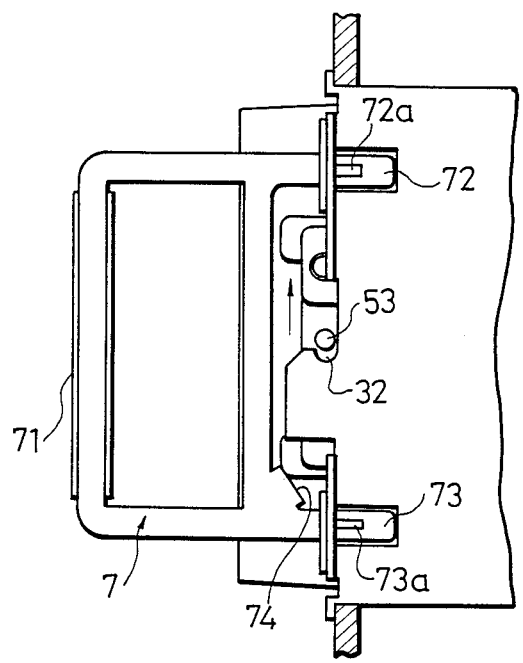
FIG. 7 is a schematic side view explanatory of the state in which the car sound apparatus is going to be detached by the use of removing members.

When the sound apparatus 4 is to be detached, the removing members 7 shown in FIG. 7 are used.

The removing member 7 has a handle 71, upper insertion arm 72, and lower insertion arm 73 formed integrally together. The lower insertion arm 73 has an inclined push-up edge 74 in its inner corner. The practical process of detachment is, in the first place, to insert the upper insertion arm 72 and lower insertion arm 73 while keeping them in contact with the engaging segments 23, 23 provided on both side faces of the inner case 2. As a result, the inclined push-up edge 74 comes into abutment on the lower face of the projection 52b of the up/down movable plate 52. As the removing member 7 is further pushed in, the up/down movable plate 52 is pushed up further by the inclined push-up edge 74 to be moved upward. Consequently, the lock pin 53 also moves upward and comes off the fitting groove 32. Then, as the handle 71 is pulled back, the upper insertion arm 72 and lower insertion arm 73 release the housing 41 of the sound apparatus 4 from the engaging segments 23, 23 of the inner case 2, and point engaging pins 72a, 73a come into engagement with the side faces 44, 44 of the sound apparatus 4, whereby the sound apparatus 4 itself can be pulled out from the inner case 2.

Figures 8, 9:
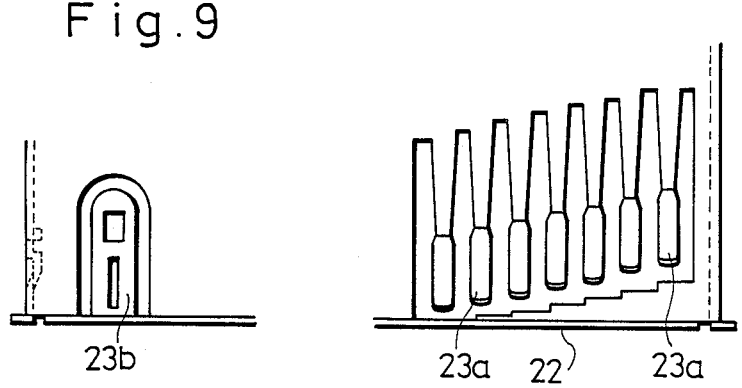
FIGS. 8 and 9 are plan views, with portions broken away, showing means for attaching the inner case to a dashboard.

As one of measures to attach the inner case 2 to the dashboard panel 1, as shown in the fragmentary plan view of FIG. 8, a plurality of standing pins 23a, . . . ,23a corresponding to the thickness of the dashboard panel may be provided on the upper and lower faces and both side faces of the housing of the inner case 2. As soon as the inner case 2 is inserted through the opening 11, the standing pins 23a, . . . ,23a rise naturally upward to hold the margin of the opening 11 in conjunction with the stopped edges 22. As another measure, as shown in the fragmentary plan view of FIG. 9, cut and raised tongue segments 23b, . . . ,23b may be provided on the upper and lower faces and both side faces of the housing of the inner case 2 as is the case of the former. These cut and raised tongue segments 23b, . . . ,23b are bent and secured by the finger and the like when the inner case 2 is inserted through the opening 11 and the stopper edges 22 come to abutment on them. In either case, the inner case can be attached effectively irrespective of the thickness of the dashboard panel and no play can appear.

As described hereinabove, according to the attachment structure of the sound apparatus of the present invention, the sound apparatus can be attached to and detached from the inner case by means of the up and down strokes of the lock pin units attached to the side faces of the sound apparatus, and the sound apparatus can be secured with preserving always a certain size of projection of the nose.

Owing to the foregoing features of the present invention, the housing itself of the inner case, as well as of the sound apparatus, can be standardized; thus, design of the housing and manufacture of a metal mold can be normalized. Accordingly, the cost of components making up the attachment structure of the sound apparatus can be reduced significantly.

What is claimed is:

1. An attachment structure for mounting a car sound apparatus by inserting the apparatus longitudinally in a rearward horizontal direction into an opening of an inner case which is fitted in an opening of a dashboard of a car, comprising:

said inner case having walls surrounding the opening of the inner case into which the sound apparatus is inserted, including at least one side wall having a pin retaining portion facing toward a forward horizontal direction, opposite from said rearward horizontal direction, having a front inclined edge inclined at an angle relative to a vertical direction and a pin retaining groove disposed in the rearward horizontal direction behind said front inclined edge;

a lock pin unit including a first plate mounted to one side of the sound apparatus corresponding to said one side wall of said inner case, a second plate and a sliding means for mounting said second plate to said first plate so as to be slidable upwardly and downwardly in the vertical direction; said second plate having a pin extending in a transverse horizontal direction, which is perpendicular to said forward and rearward horizontal directions;

wherein upon insertion of the apparatus into the opening of said inner case, said pin of said lock pin unit is slidingly engaged with said front inclined edge of said pin retaining portion of said one side wall of said inner case to displace said pin and said second plate vertically upward along said front inclined edge and then vertically downward into said pin retaining groove for mounting the apparatus into said inner case, and conversely, for detaching the apparatus from said inner case, said pin is displaced vertically upward out of said groove and vertically downward along said inclined edge.

2. An attachment structure according to claim 1, wherein said inner case has two oppositely disposed side walls each provided with said pin retaining portion, and said apparatus has two corresponding lock pin units provided on two corresponding side walls thereof.

3. An attachment structure according to claim 1, further comprising a front face plate mountable to a front wall of the sound apparatus and upper and lower clamp members which are disposed on opposite vertical sides of the lock pin unit to restrict any vertical movement of said second plate when said front face plate is mounted to the sound apparatus.

* * * * *